US009995966B2

(12) United States Patent
Kang

(10) Patent No.: US 9,995,966 B2
(45) Date of Patent: Jun. 12, 2018

(54) DISPLAY PANEL AND DISPLAY APPARATUS HAVING RETARDATION FILM WITH GRID

(71) Applicant: SAMSUNG ELECTRONICS CO., LTD., Suwon-si, Gyeonggi-do (KR)

(72) Inventor: Young Mo Kang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 106 days.

(21) Appl. No.: 15/080,771

(22) Filed: Mar. 25, 2016

(65) Prior Publication Data

US 2016/0313590 A1  Oct. 27, 2016

(30) Foreign Application Priority Data

Apr. 22, 2015 (KR) .................. 10-2015-0056455

(51) Int. Cl.
*G02F 1/1335* (2006.01)
*G02F 1/13363* (2006.01)

(52) U.S. Cl.
CPC .... *G02F 1/13363* (2013.01); *G02F 1/133528* (2013.01); *G02F 2001/133548* (2013.01); *G02F 2001/133631* (2013.01)

(58) Field of Classification Search
CPC .. G02B 6/0036; G02B 6/0016; G02B 6/0028; G02B 6/0038; G02B 26/06; G02B 27/0944; G02B 26/02; G02F 1/133514; G02F 1/133524; G02F 2001/133548
See application file for complete search history.

(56) References Cited

U.S. PATENT DOCUMENTS

| 6,822,713 | B1 | 11/2004 | Yaroshchuk et al. |
| 7,482,188 | B2 | 1/2009 | Moon et al. |
| 8,297,765 | B2 | 10/2012 | Chen et al. |
| 2007/0166857 | A1 | 7/2007 | Moon et al. |
| 2008/0100779 | A1* | 5/2008 | Choo .......... B29D 11/0074 349/96 |
| 2010/0165598 | A1 | 7/2010 | Chen et al. |
| 2014/0028956 | A1* | 1/2014 | Choi ............ G02F 1/133528 349/96 |
| 2014/0125926 | A1 | 5/2014 | Park et al. |
| 2015/0002791 | A1* | 1/2015 | Nam ................. G02B 5/3058 349/96 |

FOREIGN PATENT DOCUMENTS

JP   2014-71326    4/2014
KR   10-2013-0005514  1/2013

* cited by examiner

*Primary Examiner* — Huyen Ngo
(74) *Attorney, Agent, or Firm* — Nixon & Vanderhye P.C.

(57) ABSTRACT

A display panel and a display apparatus are disclosed, the display panel including: a first substrate; a second substrate arranged to face the first substrate; a liquid crystal layer interposed between the first and second substrates; and a retardation compensation layer including a grid pattern which is provided on one or more of the first and second substrates, and is configured to compensate for optical anisotropy of the liquid crystal layer and includes a first parameter in a first direction and a second parameter in a second direction perpendicular to the first direction. A structure for compensation for optical retardation is provided within the display panel to replace a conventional viewing angle compensation film, and thus the panel manufacturing process is shortened and a cost reduction is achieved.

16 Claims, 11 Drawing Sheets

DISPLAY PANEL AND DISPLAY APPARATUS HAVING RETARDATION FILM WITH GRID

CROSS-REFERENCE TO RELATED APPLICATION

This application is based on and claims priority under 35 U.S.C. § 119 to Korean Patent Application No. 10-2015-0056455, filed on Apr. 22, 2015 in the Korean Intellectual Property Office, the disclosure of which is incorporated by reference herein in its entirety.

BACKGROUND

Field

Apparatuses and methods disclosed herein relate generally to a display panel and a display apparatus, and for example, to a display panel and a display apparatus which provides an improved viewing angle.

Description of the Related Art

A display apparatus is an apparatus that is capable of displaying a broadcast signal or image signals/image data in various formats through a display panel displaying an image therein, and is achieved by a television, monitor, etc. Such display panel is achieved by various types such as a liquid crystal panel, plasma panel, etc. depending on its characteristic, and applies to various display apparatuses. If a liquid crystal display panel which cannot generate light on its own is used as a display panel, a backlight unit is provided in the display apparatus to generate and supply light to the display panel.

When light is emitted from a backlight unit to pass through a liquid crystal layer that has a refractive index anisotropy, a retardation may arise depending on an incident angle of such light. That is, a retardation of light arises in accordance a transmission refractive index of light depending on a viewing position, and for example, the quantity of light and wavelength, when an image is viewed from a lateral side is different from those when an image is viewed from a front side, and this is a light leakage.

Since visibility of a display apparatus may be reduced due to a change in a contrast ratio resulting from a viewing angle, a gray scale reversal or a color shift, a structure for guaranteeing a viewing angle of a display panel may become a significant issue in a liquid crystal display panel.

SUMMARY

According to an aspect of an example embodiment, a display panel is provided, including: a first substrate; a second substrate arranged to face the first substrate; a liquid crystal layer interposed between the first and second substrates; and a retardation compensation layer including a grid pattern provided on at least one of the first and second substrates, the retardation compensation layer being configured to compensate for optical anisotropy of the liquid crystal layer and includes a first parameter in a first direction and a second parameter in a second direction perpendicular to the first direction. Accordingly, a structure for compensation for optical retardation is provided within the display panel to replace a viewing angle compensation film.

The retardation compensation layer may be interposed between at least one of the first substrate and the second substrate, and the liquid crystal layer. Thus, a grid pattern for compensating for a viewing angle may be formed without difficulty during a semiconductor manufacturing process.

The retardation compensation layer may include the grid pattern that is formed on a surface of at least one of the first and second substrates. Such a grid pattern may compensate for optical anisotropy.

The retardation compensation layer may compensate for biaxial anisotropy of the liquid crystal layer having a refractive index of $nx \neq ny \neq nz \neq nx$, through the grid pattern formed on the surface of at least one of the first and second substrates, wherein nx refers to a refractive index of light with respect to an X-axis direction component, ny refers to a refractive index of light with respect to an Y-axis direction component and nz refers to a refractive index of light with respect to a Z-axis direction component. Therefore, conventional plural viewing angle compensation films are not required to compensate for biaxial anisotropy.

The retardation compensation layer may include a structure in which the grid pattern, which projects in parallel with a moving direction of light passing through the liquid crystal layer and extends along the first and second directions on a predetermined plane perpendicular to the moving direction of the light, is arranged on a surface of at least one of the first and second substrates. Therefore, a design for compensating for optical anisotropy of various characteristics is available.

The grid pattern may be periodically arranged with a preset height in the projecting direction, and a first width and a second width with respect to the first and second directions, respectively, and a first pitch and a second pitch with respect to the first and second directions, respectively. With the mass production of the grid pattern, productivity may be improved.

The grid pattern may be designed by determining values corresponding to a first parameter corresponding to the first width, a second parameter corresponding to the second width, a third parameter corresponding to the first pitch, a fourth parameter corresponding to the second pitch and a fifth parameter corresponding to the height. Various optical compensation designs may be made by setting the various parameter values.

The values of the third and fourth parameters may, for example, be less than 400 nm. Diffraction and moire phenomena may be prevented and/or reduced.

The display panel may further include: a first polarizing layer and a second polarizing layer for polarizing and filtering an irradiation light that passes through the liquid crystal layer, wherein the retardation compensation layer may be interposed between the first polarizing layer and the second polarizing layer. Even in a panel having a polarizing layer, a viewing angle compensation design using a grid pattern may be made.

The first polarizing layer may include a linear grid structure formed on a plate surface of the first substrate, the second polarizing substrate may include a linear grid structure formed on a plate surface of the second substrate, and the retardation compensation layer may be interposed between the first polarizing layer and the liquid crystal layer or between the second polarizing layer and the liquid crystal layer. Thus, a viewing angle compensation design using an additional grid pattern may be made with respect to a linear grid polarizing layer.

The retardation compensation layer may include a first retardation compensation layer and a second retardation compensation layer, and the first retardation compensation layer may include the grid pattern formed on the plate surface of the first substrate, and the second retardation compensation layer may include a perpendicular grid pattern formed on the surface of the second substrate. A design for compensating for optical anisotropy may be made through a combination of various patterns.

The retardation compensation layer may include a first retardation compensation layer and a second retardation compensation layer, and the first retardation compensation layer may include a perpendicular grid pattern formed in the surface of one of the first and second substrates, and the second retardation compensation layer may be formed on the first retardation compensation layer. As a design for compensating for optical anisotropy of various characteristics is available, adaptability may be improved in the panel manufacturing process.

According to an aspect of an example embodiment, a display apparatus is provided, including: a display panel; a backlight configured to supply light to display an image in the display panel, wherein the display panel includes: a first substrate; a second substrate arranged to face the first substrate; a liquid crystal layer interposed between the first and second substrates; and a retardation compensation layer including a grid pattern provided on at least one of the first and second substrates, the grid pattern configured to compensate for optical anisotropy of the liquid crystal layer and includes a first parameter in a first direction and a second parameter in a second direction perpendicular to the first direction. Accordingly, a structure for compensation for optical retardation is provided within the display panel to replace existing conventional viewing angle compensation film.

The retardation compensation layer may be interposed between at least one of the first substrate and the second substrate, and the liquid crystal layer. Thus, a grid pattern for compensating for a viewing angle may be formed without difficulty during a semiconductor manufacturing process.

The retardation compensation layer may include the grid pattern that is formed on a surface of at least one of the first and second substrates. Such a grid pattern may compensate for optical anisotropy.

The retardation compensation layer may compensate for biaxial anisotropy of the liquid crystal layer having a refractive index of nx≠ny≠nz≠nx, through the grid pattern formed on the surface of at least one of the first and second substrates, wherein nx refers to a refractive index of light with respect to an X-axis direction component, ny refers to a refractive index of light with respect to an Y-axis direction component and nz refers to a refractive index of light with respect to a Z-axis direction component. Therefore, conventional plural viewing angle compensation films are not needed to compensate for biaxial anisotropy.

The retardation compensation layer may include a structure in which the grid pattern, which projects in parallel with a moving direction of light passing through the liquid crystal layer and extends along the first and second directions on a predetermined plane perpendicular to the moving direction of the light, is arranged on a surface of at least one of the first and second substrates. Therefore, a design for compensating for optical anisotropy of various characteristics is available.

The grid pattern may be periodically arranged with a preset height in the projecting direction, and a first width and a second width with respect to the first and second directions, respectively, and a first pitch and a second pitch with respect to the first and second directions, respectively. With the mass production of the perpendicular grid pattern, productivity may be improved.

The perpendicular grid pattern may be designed by determining values corresponding to a first parameter corresponding to the first width, a second parameter corresponding to the second width, a third parameter corresponding to the first pitch, a fourth parameter corresponding to the second pitch and a fifth parameter corresponding to the height. Various optical compensation designs may be realized by setting various parameter values.

The values of the third and fourth parameters may be less than 400 nm. Diffraction and moire phenomena may be prevented and/or reduced.

The display apparatus may further include: a first polarizing layer and a second polarizing layer for filtering an irradiation light that passes through the liquid crystal layer, wherein the retardation compensation layer may be interposed between the first polarizing layer and the second polarizing layer. Even in a panel having a polarizing layer, a viewing angle compensation design using a grid pattern may be made.

The first polarizing layer may include a linear grid structure formed on a plate surface of the first substrate, the second polarizing substrate may include a linear grid structure formed on a plate surface of the second substrate, and the retardation compensation layer may be interposed between the first polarizing layer and the liquid crystal layer or between the second polarizing layer and the liquid crystal layer. Thus, a viewing angle compensation design using an additional grid pattern may be made with respect to a linear grid polarizing layer.

The retardation compensation layer may include a first retardation compensation layer and a second retardation compensation layer, and the first retardation compensation layer may include the grid pattern formed on the plate surface of the first substrate, and the second retardation compensation layer may include the grid pattern formed on the surface of the second substrate. A design for compensating for optical anisotropy may be made through a combination of various patterns.

The retardation compensation layer may include a first retardation compensation layer and a second retardation compensation layer, and the first retardation compensation layer may include the grid pattern formed on the surface of one of the first and second substrates, and the second retardation compensation layer may be formed on the first retardation compensation layer. As a design for compensating for optical anisotropy of various characteristics is available, adaptability may be improved in the panel manufacturing process.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Example embodiments will be described in greater detail below with reference to accompanying drawings. The disclosure is not limited to the example embodiments described herein and may be achieved in various forms. The portions which do not relate to description of the disclosure may be omitted to avoid doubt, and like numerals are given to like or similar elements throughout the entire description. The term such as "include" or "have" in the example embodiments may be used to specify the existence of characteristic, numbers, steps, operations, elements or a combination thereof in the description, and does not exclude a possibility that there may be at least another characteristic, numbers, steps, operations, elements or a combination thereof or that the foregoing is added.

Figure 1:
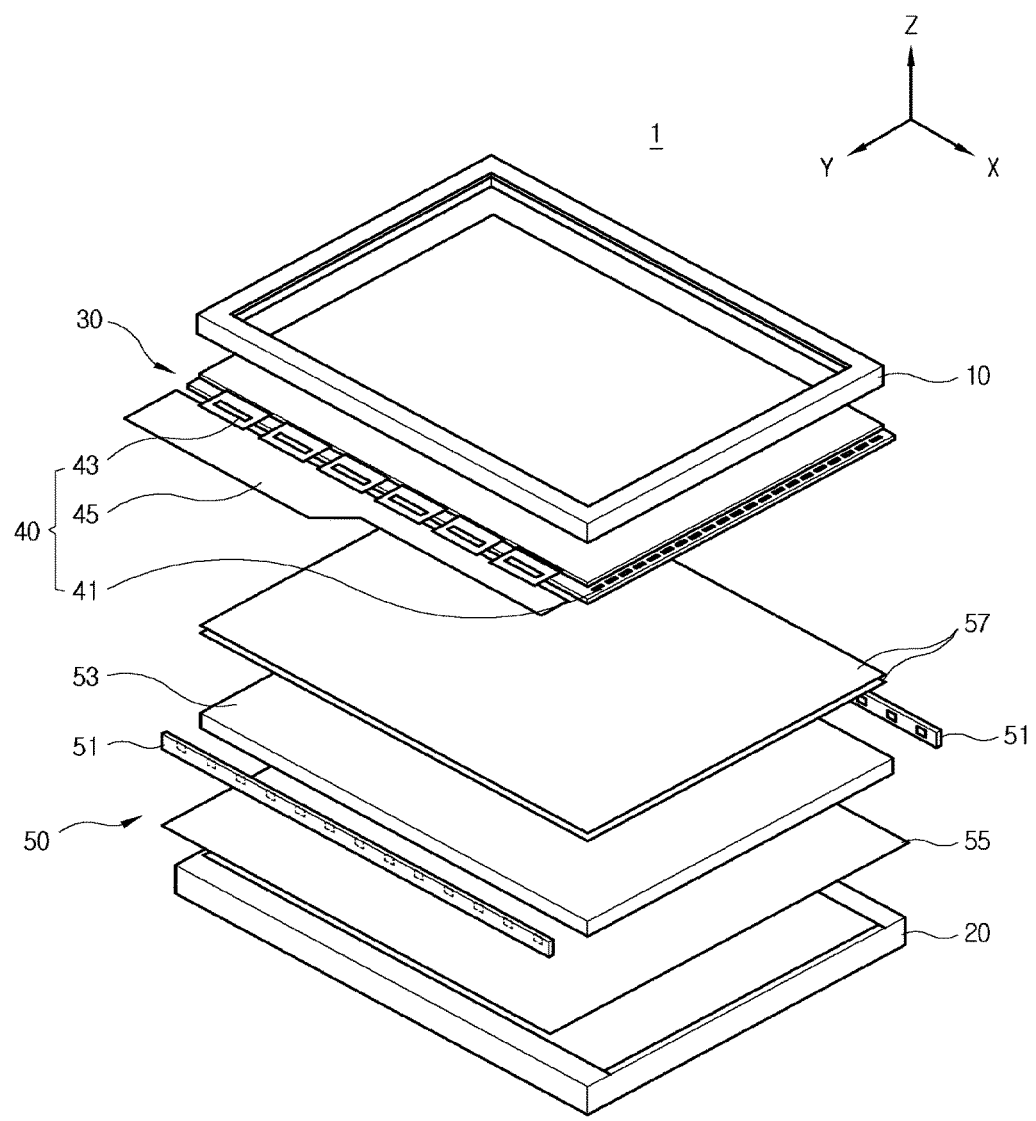
FIG. 1 is an exploded perspective view illustrating an example display apparatus.

FIG. 1 is an exploded perspective view illustrating an example display apparatus 1. In this example embodiment, the display apparatus 1 including a liquid crystal display panel 30 is described, but the disclosure is not limited to the foregoing, and may equally apply to a display panel that emits lights by itself such as an OLED, or the like.

As illustrated in FIG. 1, the display apparatus 1 may process an image signal provided from the exterior and display the processed image by itself. In this example embodiment, the display apparatus 1 includes a television as an example. However, the display apparatus 1 may be achieved by other various forms such as a TV, monitor, portable multimedia player, mobile phone, etc., and the kind of its achievement is not limited as long as it includes a display panel 30 for displaying an image.

The display apparatus 1 may include, for example, cover frames 10 and 20 for forming an accommodation space therein; a display panel 30 that is accommodated in the accommodation space formed by the cover frames 10 and 20 and displays an image on an upper plate surface; a panel driver 40 for driving the display panel 30; and a backlight unit 50 that is arranged in the accommodation space formed by the cover frames 10 and 20 and faces a lower plate surface of the display panel 30 and supplies light to the display panel 30.

Each of directions illustrated in FIG. 1 will be described. Directions X, Y and Z basically refer to horizontal, vertical and normal directions of the display apparatus 30 in FIG. 1. In FIG. 1, the display panel 30 is arranged in parallel with a X-Y plane that is formed by an axis of the X direction and an axis of the Y direction; and the cover frames 10 and 20, the display panel 30 and the backlight unit 50 are arranged along an axis of the Z direction. Accordingly, the axis Z is set as a vertical direction with respect to a screen of the display apparatus 1, and axes X and Y are defined as voluntary directions on the screen. Opposite directions of the X, Y and Z directions are referred to as −X, −Y and −Z directions.

Unless otherwise set forth herein, "upper side/upward direction" means the Z direction, and "lower side/downward direction" means the −Z direction. For example, the backlight unit 50 is arranged in a lower side of the display panel 30, and an irradiation light that is emitted by the backlight unit 50 is incident to a lower plate surface of the display panel 30 and is discharged from an upper plate surface of the display panel 30.

The cover frames 10 and 20 form an external appearance of the display apparatus 1, and support the display panel 30 and the backlight unit 50 that are accommodated in the cover frames 10 and 20. In the drawing, if the Z direction is a upward direction or front direction and the −Z direction is a downward direction or rear direction based on the display panel 30, the cover frames 10 and 20 include a front cover 10 for supporting a front portion of the display panel 30, and a rear cover 20 for supporting a rear portion of the backlight unit 50. The front cover 10 includes an opening that exposes an image display area of the display panel 30 to the exterior on a plate surface that is in parallel with the X-Y plane.

The display panel 30 is a liquid crystal type, and a liquid crystal layer 130 (see FIG. 2) is interposed between two substrates 110 and 120 (see FIG. 2), and as an arrangement of the liquid crystal layer 130 is adjusted by a driving signal applied thereto, an image is displayed on a plate surface of the display panel 30. The display panel 30 does not emit light on its own and receives light from the backlight unit 50 to display an image on an image display area on a plate surface thereof.

The panel driver 40 applies a driving signal to the display panel 30 to drive the liquid crystal layer 130. The panel driver 40 may include, for example, a gate driving integrated circuit (IC) 41, a data chip film package 43 and a printed circuit board (PCB) 45.

The gate driving IC 41 is installed in a substrate (not shown) of the display panel 30, and is connected to each gate line (not shown) of the display panel 30. The data chip film package 43 is connected to each data line (not shown) formed in the display panel 30. The data chip film package 43 may include a tape automated bonding (TAB) tape in which a semiconductor chip is bonded with a wire pattern formed in a base film through TAB technology. The chip film package may include, e.g., a tape carrier package (TCP) or a chip on film (COF). The PCB 45 inputs a gate driving signal to the gate driving IC 41, and inputs a data driving signal to the data chip film package 43.

With the foregoing configuration, the panel driver 40 inputs a driving signal to each gate line and each data line of the display panel 30, thereby driving a liquid crystal layer (not shown) of the display panel 30 per pixel.

The backlight unit 50 is arranged in the −Z direction of the display panel 30 to supply an irradiation light to a lower plate surface of the display panel 30. The backlight unit 50 may include a light source 51 that may, for example, be arranged in an edge area of the display panel 30, a light guiding plate 53 that is arranged in parallel with the display panel 30 to face a lower plate surface of the display panel 30, a reflective plate 55 that is arranged in a lower surface of the light guiding plate 53 to face a lower plate surface of the light guiding plate 53, and at least one optical sheet 57 that is interposed between the display panel 30 and the light guiding plate 53.

In this example embodiment, the configuration of the backlight unit 50 as an edge structure in which the light source 51 is arranged in an edge of the light guiding plate 53, and a light emitting direction of the light source 51 is perpendicular to a light discharging direction of the light guiding plate 53 is expressed. However, the method of achieving the backlight unit 50 is not limited to this example embodiment, and various design change can be made to the backlight unit 50. For example, the backlight unit 50 may be achieved by a direct type in which, e.g., the light source 51 is arranged below the light guiding plate 53, and a light irradiating direction of the light source 51 may be in parallel with a light discharging direction of the light guiding plate 53.

The light source 51 generates light and irradiates the generated light to be incident to the light guiding plate 53. The light source 51 is installed to stand with respect to the plate surface, i.e., the X-Y plane of the display panel 30, and is arranged along at least one of the edges in four directions of the display panel 30 or the light guiding plate 53. The light source 51 may, for example, be achieved by an LED array in which a light emitting element (not shown) that is achieved by an LED, etc. is sequentially arranged on a module substrate (not shown) extending in the X direction. In this example embodiment, the light emitting element of the light source 51 may be achieved by various types such as a cold cathode fluorescence lamp (CCFL) or hot cathode fluorescence lamp (HCFL), or the like, as well as LED.

The light guiding plate 53 may, for example, be a plastic lens that is achieved by an acrylic mold, etc., and substantially uniformly guides light from the light source 51 to a whole image display area of the display panel 30. A lower plate surface of the light guiding plate 53 as a plate surface in the −Z direction faces the reflective plate 55, and a lateral wall of the light guiding plate 53 in the Y direction and −Y direction among four lateral walls thereof in four directions formed between an upper plate surface and a lower plate surface of the light guiding plate 53 faces the light source 51. Light irradiated by the light source 51 is incident to the lateral wall of the light guiding plate 53 in the Y direction and −Y direction.

The light guiding plate 53 has various optical patterns (not shown) formed in a lower surface thereof to scatter and reflect light, which is disseminated within the light guiding plate 53, or to convert a light advancing direction, thereby substantially uniformly distributing light discharged by the light guiding plate 53.

Below the light guiding plate 53, the reflective plate 55 reflects light, which has been emitted from the interior to the exterior of the light guiding plate 53, back to the interior of the light guiding plate 53. The reflective plate 55 reflects light that is not reflected by an optical pattern formed in a lower plate surface of the light guiding plate 53 to the interior of the light guiding plate 53. To do so, an upper plate surface of the reflective plate 55 has a substantially total reflection characteristic.

At least one optical sheet 57 is arranged on the light guiding plate 53 to adjust an optical characteristic of light discharged by the light guiding plate 53. The optical sheet 57 may include a diffusion sheet, prism sheet, protective sheet, dual brightness enhancement film (DBEF), etc., and may be arranged on the light guiding plate 53 by a combination of at least two of the foregoing sheets by taking into account a final result of the optical characteristic to be adjusted.

Figure 2:
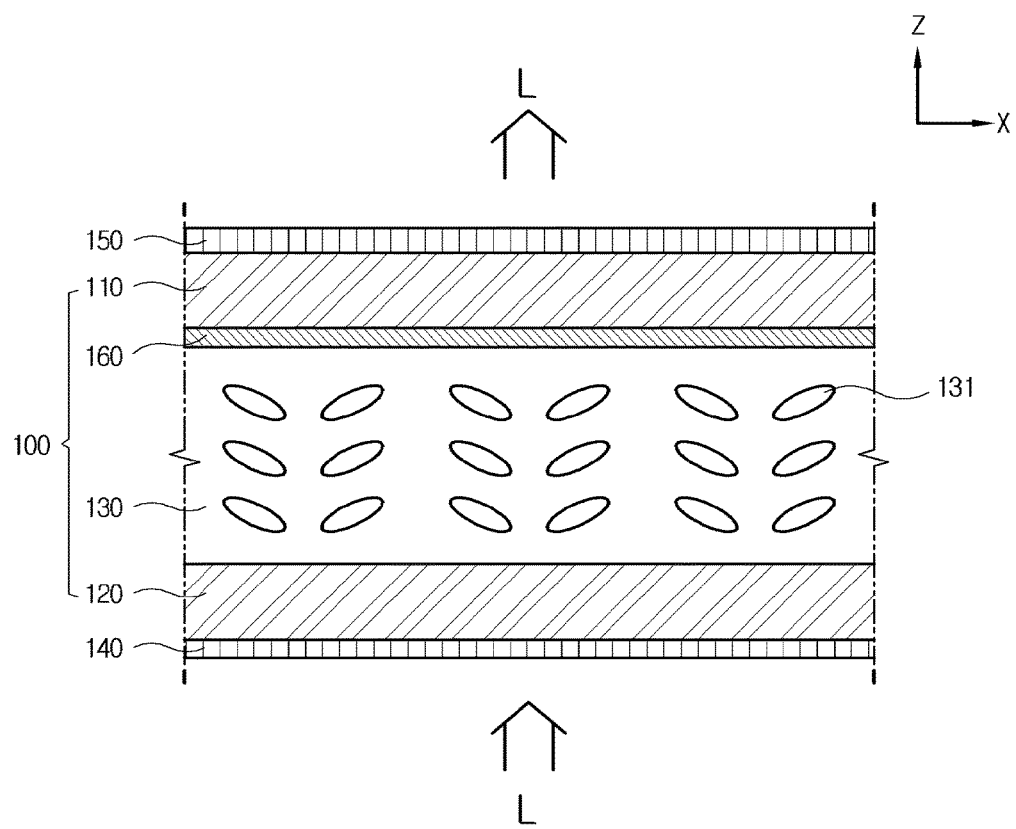
FIG. 2 is a cross-sectional view illustrating an example arrangement status of elements of a display panel.

FIG. 2 is a cross-sectional view illustrating an example arrangement of elements of the display panel 100. The display panel 100 in FIG. 2 has substantially the same configuration as the display panel 30 in FIG. 1, and may apply to the display apparatus 1 in FIG. 1.

As illustrated in FIG. 2, an irradiation light L that is discharged by the backlight unit 50 (see FIG. 1) in a Z direction is incident to the display panel 100, and is discharged in the Z direction after passing through several elements that form the display panel 100.

Below, the expressions "upper part/upper side" and "lower part/lower side" refer to a relative arrangement or arrangement relationship along the Z direction as a moving direction of the light L.

The display panel 100 includes a first substrate 110 (hereinafter, to be also referred to as a an upper substrate), a second substrate 120 (hereinafter, to be also referred to as a lower substrate) arranged to face the first substrate 110, and a liquid crystal layer 130 that is interposed between the first and second substrates 110 and 120.

The display panel 100 in this example embodiment further includes a retardation compensation layer 160 that is interposed between the liquid crystal layer 130 and at least one of the first substrate 110 and the second substrate 120. The example embodiment in FIG. 2 illustrates an example of the retardation compensation layer 160 that is interposed between the liquid crystal layer 130 and the upper substrate 110.

As illustrated therein, a first polarizing layer 150 (hereinafter, to be also referred to as the upper polarizing layer) may be provided on the first substrate 110, and a second polarizing layer 140 (hereinafter, to be also referred to as the lower polarizing layer) may be provided below the second substrate 120.

In FIG. 2, the upper and lower polarizing layers 150 and 140 are arranged on and below the display panel 100, respectively, as an example, but the disclosure is not limited to the foregoing example. Alternatively, polarizing layers may not be needed in the display apparatus 1 that is achieved by an LCD, or a polarizing layer may be provided on a surface of the display panel 100. For example, the polarizing layers in the display panel 100 according to the disclosure may not be an essential element.

The display panel 100 is just one of various panel structures, and various types of panel structures can be applicable depending on a design method, and thus this example embodiment does not limit the structure of the display panel 100. In addition, this example embodiment schematically provides representative elements of the display panel 100, and the actual structure of the display panel 100 is more complicated, and includes other additional elements that are not described in this example embodiment; provided, however, that only the basic structure of the display panel that directly relates to the spirit of the disclosure will be described, and a specific structure of the display panel 100 that does not directly relate to the spirit of the disclosure may not be described.

Each of the elements of the display panel 100 will be described in more detail below.

The upper and lower substrates 110 and 120 are transparent substrates that face each other leaving a predetermined gap therebetween along the moving direction of light. From the perspective of the material, the upper and lower substrates 110 and 120 may, for example, be achieved by substrates having glass or plastic as their material. For example, if a plastic substrate is used, the upper and lower substrates 110 and 120 may employ materials such as poly-carbonate (PC), poly-imide (PI), poly-ethersulphone (PES), poly-acrylate (PAR), poly-ethylene-naphthelate (PEN) and poly-ethylene-terephehalate (PET).

The upper and lower substrates 110 and 120 may be required to have a preset characteristic depending on the driving method of the liquid crystal layer 130. For example, if the driving method of the liquid crystal layer 130 is a passive matrix, a soda lime glass may be used, and if an active matrix, alkali free glass and borosilicate glass may be used.

The lower substrate 120 includes signal cables (not shown), a thin film transistor (TFT) (not shown) that is electrically connected to the signal cables, and a pixel electrode (not shown) that is electrically connected to the TFT. The pixel electrode includes a transparent conductive material, and receives data voltages from the signal cables through the TFT.

The upper substrate 110 includes a common electrode (not shown) that corresponds to the pixel electrodes. The common electrode includes a transparent conductive material, and receives a common voltage.

The liquid crystal layer 130 is interposed between the upper and lower substrates 110 and 120, and adjusts light transmissivity as the arrangement of liquid crystals 131 is changed based on a driving signal supplied thereto.

Although ordinary liquid does not have any regularity in the direction and arrangement of molecules, liquid crystal is similar to a liquid phase that has regularity to some extent. For example, there is a solid that becomes a liquid phase showing anisotropy such as birefringence if melted by heat. The liquid crystals 131 have an optical characteristic such as birefringence or change in color. Since the regularity of the liquid crystal is that of crystal, and the phase of the material of the liquid crystal is similar to liquid, the liquid crystal is called so. If a voltage is applied to the liquid crystals 131, the arrangement of the molecules is changed so that the optical characteristic is changed.

The liquid crystals 131 of the liquid crystal layer 130 may be classified into nematic, cholesteric, smectic, and ferroelectric liquid crystal depending on the arrangement of molecules.

The liquid crystal layer 130 may be classified into a twisted nematic (TN) mode, super twisted nematic (STN) mode, in-plane switching mode and vertical alignment (VA) mode depending on the driving method of the liquid crystals 131. The liquid crystal layer 130 in this example embodiment is described as a VA Mode, but not limited thereto. Alternatively, the liquid crystal layer 130 may be achieved by another mode depending on its driving method.

If the liquid crystal layer 130 is driven in a VA mode, unless an electric field is formed between the pixel electrode and common electrode, the liquid crystals 131 of the liquid crystal layer 130 are aligned in a vertical direction with respect to a surface of the lower substrate 120. If an electric field is formed between the pixel electrode and common electrode, the liquid crystals 131 of the liquid crystal layer 130 are inclined with respect to the surface of the lower substrate 120, and the angle of inclination is great as the electric field become strong, and ultimately, the liquid crystals 131 are aligned in a horizontal direction with respect to the surface of the lower substrate 120.

The lower polarizing layer 140 is located on a plate surface of the lower substrate 120 in a −Z direction, i.e., on a plate surface of the lower surface 120 in which the light L is incident. The lower polarizing layer 140 allows only a preset first polarizing direction component of the irradiation light L to pass through the lower polarizing layer 140, and reflects or absorbs a non-first polarizing direction component of the irradiation light L.

The upper polarizing layer 150 is located on a plate surface of the upper substrate 110 in the Z direction, i.e., on a plate surface of the upper substrate 110 from which the irradiation light L is discharged. The upper polarizing layer 150 allows only a preset second polarizing direction component of the irradiation light L, which has passed through the lower polarizing layer 140, the lower substrate 120, the liquid crystal layer 130 and the upper substrate 110, to pass through the upper polarizing layer 150, and reflects or absorbs a non-second polarizing direction component of the irradiation light L.

The second polarizing direction may be different from the first polarizing direction, e.g. may be perpendicular to the first polarizing direction. This is because the polarizing direction of the irradiation light L rotates by 90 degrees by the liquid crystal layer 130 as the irradiation light L passes through the liquid crystal layer 130. If the upper polarizing layer 150 allows the first polarizing direction component of light to passes therethrough like the lower polarizing layer 140 does, the irradiation light L of the first polarizing direction that has passed the lower polarizing layer 140 is adjusted to the second polarizing direction by passing through the liquid crystal layer 130, and may not pass through the upper polarizing layer 150. Accordingly, the polarizing direction of light that passes through the upper polarizing layer 150 is preferably vertical to the polarizing direction of light that passes through the lower polarizing layer 140.

For example, the lower polarizing layer 140 may include a first absorption axis that is in parallel with the second direction, and a first transmission axis that is in parallel with the first direction perpendicular to the second direction. For example, the light that has passed through the lower polarizing layer 140 may be biased toward the first direction.

The upper polarizing layer 150 may include a second absorption axis that is in parallel with the first direction, and a second transmission axis that is in parallel with the second direction. For example, the light that has passed through the upper polarizing layer 150 may be biased toward the second direction. The first and second directions are perpendicular to the moving direction of light.

If the liquid crystal layer 130 is a VA mode, and if a user views an image in the display panel 100 from a center of the display panel 100 to face a Z-direction axis, there is no problem for a user to recognize the image. However, if a user views an image in the display panel 100 from a lateral side of the display panel 100 to be inclined with respect to the Z-direction axis, a light leakage phenomenon pursuant which the irradiation light L is leaked may take place. The light leakage phenomenon takes places due to a delay in the light L, e.g., due to retardation, and as illustrated in FIG. 2, the retardation compensation layer 160 is needed to compensate for such delay.

The retardation in this example embodiment refers to a difference of a phase that takes place in a light wave. The phase means a situation of a change at a certain time or at a certain place with respect to a phenomenon that is repeated periodically.

The retardation compensation layer 160 changes a moving speed of the irradiation light L, e.g., delays a phase of the irradiation light L to thereby convert the polarization state of the irradiation light L. The thickness of the retardation compensation layer 160 may be determined to offset the retardation of the amount of light, the phase of which is converted by the liquid crystal layer 130, in proportion to the density of the liquid crystals 131 within a unit volume of the liquid crystal layer 130, and e.g., may have a predetermined value ranging between 20 and 30 nm.

If the retardation compensation layer 160 is arranged in a location that is after the light L passes through the upper polarizing layer 150, e.g., is arranged on the upper polarizing layer 110, retardation is compensated for with respect to the irradiation light L, which has been already polarized and filtered, and the light leakage phenomenon may not be properly remedied.

Therefore, by interposing the retardation compensation layer 160 in FIG. 2 between the upper substrate 110 and the liquid crystal layer 130, the retardation may be compensated for with respect to the irradiation light L before the irradiation light L, which has passed through the liquid crystal layer 130, is polarized and filtered by the upper polarizing layer 150.

In this example embodiment, the retardation compensation layer 160 is interposed between the upper and lower substrates 110 and 120, and for example, may be achieved by a nano pattern that is formed on a surface of at least one of the upper and lower substrates 110 and 120.

A more detailed configuration of the retardation compensation layer 160 will be described below.

In the display panel 100 such as an LCD, a retardation takes place due to the liquid crystals 131, and this results in a change in color according to a change in the amount of light of red (R), green (G), and blue (B) when the display panel 100 is viewed from a lateral side not a front side. To address such a problem, the retardation compensation layer 160, which is also called optical compensation layer or viewing angle compensation layer, is provided.

Retardation takes place by birefringence as the characteristic of the liquid crystals 131, and refers to the phenomenon pursuant which a refractive index varies depending on a direction of light wave. If a refractive index of light in the X-axis direction is called nx, a refractive index of light in the Y-axis direction is called ny and a refractive index of light in the Z-axis direction is called nz, the occurrence of retardation falls under the case where the following is not satisfied: nx=ny=nz.

As illustrated in FIG. 2, the irradiation light L irradiated by the display panel 100 according to an example embodiment to the backlight unit 50 moves in the Z direction, and the retardation compensation layer 160 is arranged on the liquid crystal layer 130.

The liquid crystals 131 that form the liquid crystal layer 130 have a characteristic of a birefringence medium in which refractive indexes in the Z-axis direction and the X-Y plan direction are different. If a refractive index of the Z-axis direction is called n(e) and a refractive index of the X-Y plane direction is called n(o), the relationship of n(e)>n(o) may be established.

The retardation conversion has a C-plate type by which an optical axis is in parallel with the Z-direction axis, and an A-plate type by which an optic axis is in parallel with an X-Y plane axis. The C-plate type satisfies "nx=ny≠nz" and the A-plate type satisfies "nx≠ny=nz."

The C-plate type may be classified into a positive C-plate (also referred to as +C plate) type and a negative C-plate (also referred to as −C plate). The A-plate type may be classified into a positive A-plate (also referred to as +A plate) type and a negative A-plate type (also referred to as −A plate).

From the perspective of refractive index, the positive C-plate type satisfies "nx=ny<nz", and the negative C-plate type satisfies "nx=ny>nz." Accordingly, if the amount of conversion of the retardation of light is equal, the positive C-plate type and negative C-plate type offset each other.

This may similarly apply to the positive A-plate type and negative A-plate type. That is, the positive A-plate type satisfies "nx>ny=nz", and the negative A-plate type satisfies "nx<ny=nz."

As a modification of the A-plate, a type of tilting an optic axis direction of the A-plate by 90 degree is also available. The positive A-plate type in which the optic axis direction is tilted by 90 degrees satisfies "nx=nz<ny", and the negative A-plate type in which the optic axis direction is tilted by 90 degrees satisfies "nx=nz>ny."

The liquid crystal layer 130 may have one of the foregoing characteristics of the retardation conversion depending on its driving mode.

For example, if the liquid crystal layer 130 is a VA mode, the liquid crystals 131 of the liquid crystal layer 130 are in a standing position in parallel with the Z axis when a voltage is not applied thereto, and display a black image. If a voltage is applied to the liquid crystals 131, the liquid crystals 131 become inclined with respect to the Z axis and display a white image. Thus, the liquid crystal layer 130 in a VA mode may have the characteristic of the positive C-plate.

The retardation compensation layer 160 should offset a retardation resulting from the liquid crystal layer 130. To do so, the retardation compensation layer 160 may be configured to have a negative retardation against the method of retardation conversion of the liquid crystal layer 130.

For example, if the retardation conversion method of the liquid crystal layer 130 is a positive C-plate type, the retardation compensation layer 160 is a negative C-plate type that has a negative retardation against the positive C-plate type. For example, with respect to the positive C-plate type liquid crystal layer 130, retardation is offset by the negative C-plate type retardation compensation layer 160 so that light is compensated for.

If the retardation conversion characteristic satisfies "nx=ny≠nz" or "nx≠ny=nz", there is anisotropy in only one direction and it is called uniaxial anisotropy.

With respect to the uniaxial anisotropy of the liquid crystal layer 130, the phase retardation may be offset by the retardation compensation layer 160 that satisfies the characteristic of one of the C-plate type and A-plate type depending on the characteristic of the liquid crystal layer 130 as described above.

On the other hand, the case where the retardation conversion characteristic has an anisotropy in all of three directions like "nx≠ny≠nz≠nx", is called biaxial anisotropy.

Generally, a display panel includes a plurality of films arranged to offset retardation due to the biaxial anisotropy. For example, to satisfy the condition of "nx>nz>ny", a combination of two layered films corresponding to a film having the characteristic of "nx>ny=nz" (positive A-plate type) and a film having the characteristic of "nx=nz >ny" (90 degree-tilted negative A-plate type) may be used.

In the display panel 100 according to an example embodiment, a pattern which projects in the Z direction (+Z direction or −Z direction) parallel to the moving direction of light is formed on a surface of one of the upper and lower substrates 110 and 120 (hereinafter, to be also called nano pattern) to realize the retardation compensation layer 160. In this example embodiment, biaxial anisotropy as well as uniaxial anisotropy may be compensated for by the nano pattern formed as discussed above.

Figure 3:
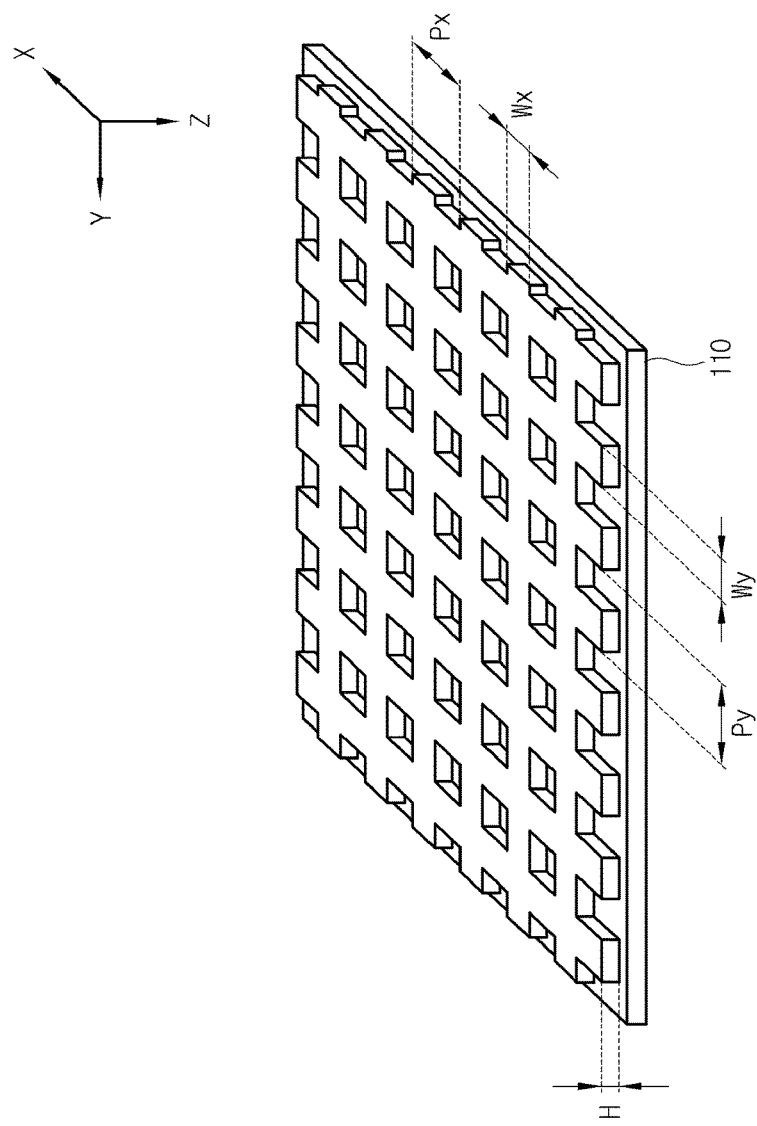
FIGS. 3 to 5 are diagrams illustrating examples of forming patterns as a radiation compensation layer.
Figure 4:
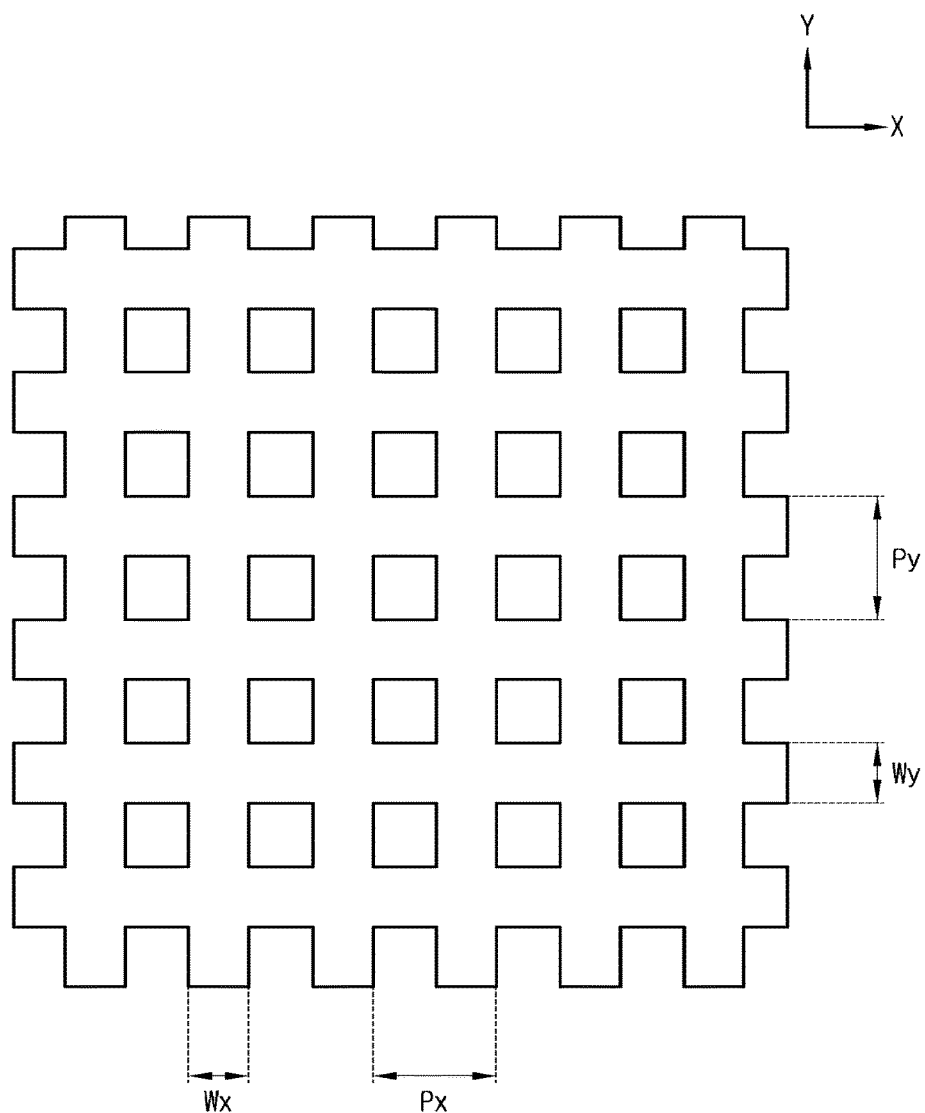
Figure 5:
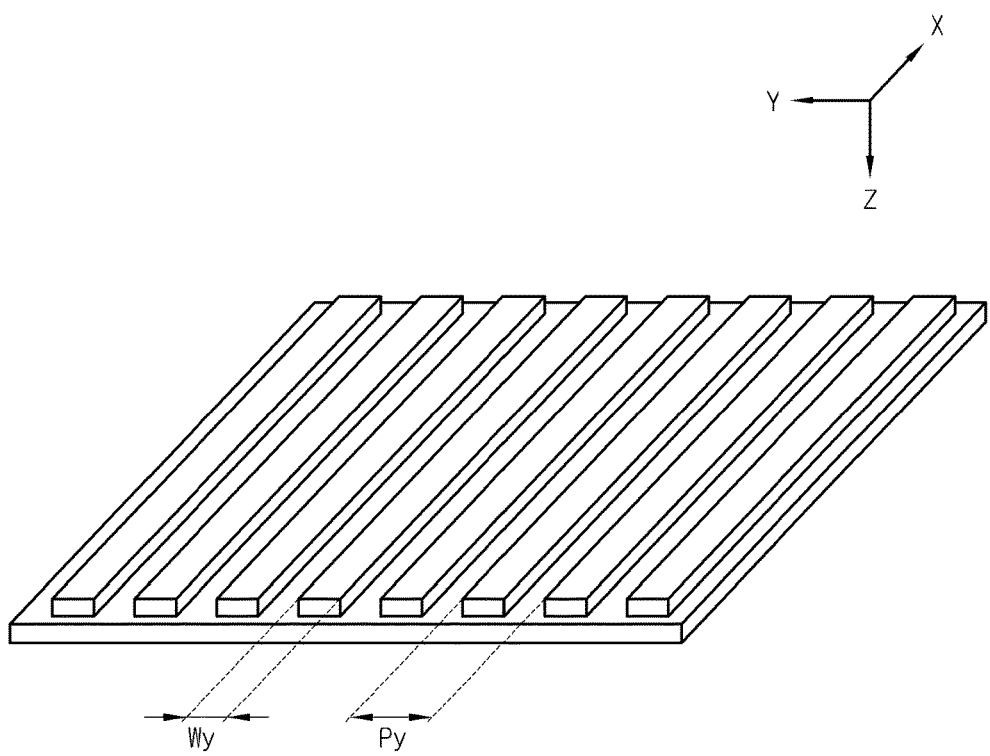

FIGS. 3 to 5 illustrate examples of patterns formed as the retardation compensation layer. FIG. 4 is a plan view of FIG. 3 when viewed from the top.

In this example embodiment, a dielectric layer is designed within a cell by a nano patterning method to replace a conventional optical compensation film.

For example, the retardation compensation layer 160 is designed as a transparent dielectric layer below the upper substrate 110, which dielectric layer is nano patterned to have a refractive index that varies depending on the direction of light. From the perspective of the material, the dielectric may employ a thin film that is transparent in visible light such as silicon dioxide (hereinafter, to be also called silica or SiO2), or silicon nitride (SiNx). A vacant space resulting from the nano patterning may be filled by air or overcoat used in a semiconductor manufacturing process. The material of the dielectric is not limited to the foregoing, and may include other various materials.

An optical refractive index of a dielectric is n1, and a refractive index of a material that fills a vacant space is n2. Unless otherwise specifically mentioned herein, it is assumed that n1>n2.

As illustrated in FIG. 3, the retardation compensation layer 160 includes a plane grid that projects toward a third direction parallel to the moving direction of light and extends in a first direction perpendicular to the moving direction of light on a predetermined plane, and for example, includes a structure in which a grid pattern of perpendicular projecting elements, which may be hereinafter referred to as a perpendicular grid pattern, is arranged in a surface of one of the upper and lower substrates 110 and 120. In this example embodiment, the X-axis direction may be parallel to the first direction, and the Y-axis direction may be parallel to the second direction and the Z-axis direction may be parallel to the third direction.

FIG. 3 illustrates an example of a perpendicular grid pattern formed in a lower surface of the upper substrate 110.

As illustrated therein, a perpendicular grid may have preset widths Wx and Wy with respect to the X direction and Y direction, respectively. Further, the perpendicular grid may be configured to have a preset height H in the −Z direction. The perpendicular grid is regularly arranged at preset pitches Px and Py (or cycle) with respect to the X direction and the Y direction, respectively, as in FIGS. 3 and 4.

In the display panel 100 according to this example embodiment, a structure of the perpendicular grid pattern may be designed by determining values of five parameters: a first parameter corresponding to a first width Wx of the perpendicular grid; a second parameter corresponding to a second width Wy; a third parameter corresponding to a first pitch Px; a fourth parameter corresponding to a second pitch Py; and a fifth parameter corresponding to a height H. The values of the third and fourth parameters are preferably set to be less than approximately 400 nm, a minimum wavelength of a visible light, and for example may be set to be 100 nm. In this manner, diffraction phenomenon and moire phenomenon may be reduced and/or prevented.

As an example of providing the retardation compensation layer 160 the characteristic of "nx>xy", it may be assumed that Wx=0 as the first parameter. FIG. 5 illustrates an example of a perpendicular grid pattern achieved to have the characteristic of "nx>xy" if it is set "Wx=0".

In the example embodiment in FIG. 5, as the width Wx in the X-axis direction (first direction) of the perpendicular grid is 0, a nano pattern in which a plurality of bars is arranged in parallel with the X-axis direction at a predetermined pitch Py on the upper substrate 100 may be formed. In such an example, a single bar has a width of Wy as the second parameter.

Refractive indexes nx and ny with respect to the X-direction component and Y-direction component of light that passes through the retardation compensation layer 160 are determined by the following formula 1 based on Effective Medium Theory:

$$n_x^2 = n_1^2 \frac{W_y}{P_y} + n_2^2 \left(1 - \frac{W_y}{P_y}\right)$$ [Formula 1]

$$\frac{1}{n_y^2} = \frac{1}{n_1^2} \frac{W_y}{P_y} + \frac{1}{n_2^2} \left(1 - \frac{W_y}{P_y}\right)$$

In the foregoing formula, n1 refers to an optical refractive index of a dielectric, e.g., SiO2 forming a plane grid pattern; and n2 refers to a refractive index of a material that fills a vacant space, e.g., air; provided, however, that the values of refractive indexes nx and xy in the formula 1 above are an approximate value and the exact values may be identified through optical simulation such as Finite Element Method.

As the nano pattern in the form of a plurality of bars is formed on a lower surface of the upper substrate 100 as in FIG. 5, the retardation compensation layer 160 satisfies the refractive index characteristic of nx>xy, and in response thereto, optical anisotropy of the liquid crystal layer 130 may be compensated for.

In the display panel 100 according to an example embodiment, by determining the values of the first to fifth parameters including the first width Wx, second width Wy, first pitch Px, second pitch Py and height H of the perpendicular grid that projects in parallel with the moving direction of light as in FIGS. 3 and 4, not only uniaxial anisotropy but also biaxial anisotropy may be compensated for.

For example, if a dielectric forming a grid pattern is SiO2 having a refractive index of n1=1.44 and if a material forming a vacant space is air having a refractive index of n2=1, the following parameter values may be designed to compensate for uniaxial anisotropy:

Px=100 nm, Py=100 nm, Wx=50 nm, Wy=0 nm

In the above values, Py is a value that has been set for purpose of convenience for optical simulation, and height H may be set to be 20 nm to 30 nm.

In such an example, it may be confirmed through optical simulation by Finite Element Method that nx=1.195, ny=nz=1.243.

Accordingly, the retardation compensation layer 160 has a retardation conversion characteristic of the negative A-plate type that satisfies nx<xy=nz.

With respect to the liquid crystal layer 130 having the positive A-plate type as an example, retardation is offset and uniaxial anisotropy of the liquid crystal layer 130 is compensated for by the negative A-plate type retardation compensation layer 160, thereby improving a viewing angle characteristic of the display panel 100.

A pattern design for compensating for biaxial anisotropy may be provided by changing the Wy value to 30 nm or 70 nm in the pattern designed as the negative A-plate type.

If an optical simulation is performed with respect to values designed as "Px=100 nm, Py=100 nm, Wx=50 nm, Wy=30 nm" through Finite Element Method, values of "nx=1.276, ny=1.289, nz=1.307" may be obtained. The height H may be set to be a predetermined value within the range of 20 to 30 nm corresponding to the thickness of the dielectric layer.

Since the retardation compensation layer 160 satisfies nx≠ny≠nz, and particularly, nx<ny<nz, biaxial anisotropy of the liquid crystal layer 130 having a characteristic corresponding to the foregoing may be compensated for.

In the display panel 100 as in the foregoing example embodiment, the perpendicular grid nano pattern is formed as the retardation compensation layer 160 in a lower surface of the upper substrate 110 to thereby compensate for biaxial anisotropy of light resulting from the liquid crystal layer 130.

Likewise, if an optical simulation is performed with respect to values designed as Px=100 nm, Py=100 nm, Wx=50 nm, Wy=70 nm through Finite Element Method, values of nx=1.376, ny=1.365, nz=1.385 may be obtained. The height H may be set to be a predetermined value within the range of 20 to 30 nm corresponding to the thickness of the dielectric layer.

Since the retardation compensation layer 160 satisfies nx≠ny≠nz, and particularly, ny<nx<nz, biaxial anisotropy of the liquid crystal layer 130 having a characteristic corresponding to the foregoing may be compensated for.

In the display panel 100 as in the foregoing example embodiment, the perpendicular grid nano pattern is formed as the retardation compensation layer 160 in a lower surface of the upper substrate 110 to thereby compensate for biaxial anisotropy of light resulting from the liquid crystal layer 130.

As described above, with a simple structure of forming the retardation compensation layer 160 of the display panel 100 according to an example embodiment as the perpendicular grid nano pattern satisfying nx≠ny≠nz≠nx in the lower surface of the upper substrate 110, biaxial anisotropy of the liquid crystal layer 130 may be compensated for. Accordingly, conventional plural optical compensation films may be replaced by a single retardation compensation layer 160 to compensate for biaxial anisotropy.

As above, example embodiments for designing the perpendicular grid nano pattern satisfying "nx<xy=nz", "nx<ny<nz", "ny<nx<nz" based on the values of the first to fifth parameters have been described, and the disclosure may be designed to correspond to various refractive indexes as well as the foregoing embodiments. For example, the retardation compensation layer 160 according to the disclosure may be variously achieved by satisfying the uniaxial/biaxial anisotropy such as "nx>ny=nz", "nx>ny>nz", "nx>nz>ny", "nx=ny>nz", and "nz>nx=ny" by changing the parameter values.

In an example embodiment, a transparent dielectric layer may be formed on a surface of the upper substrate 110 or the lower substrate 120 of the display panel 100 and the dielectric layer is nano patterned to achieve the perpendicular grid pattern retardation compensation layer 160 as illustrated in FIG. 3.

For example, a manufacturer may arrange a dielectric layer on a substrate. The substrate is one of the upper substrate 110 or the lower substrate 120 of the display panel 100, and includes a transparent material to allow light to pass through it. As an example in the example embodiment illustrated in FIG. 2, a dielectric layer including silicon dioxide or silicon nitride may be arranged on a lower surface of the upper substrate 110.

The manufacturer may expose the dielectric layer. The exposure may be conducted by irradiating ultraviolet rays.

In this example embodiment, photolithography may be used for an exposure process. For example, the foregoing perpendicular grid pattern may be developed by applying a resist and selectively irradiating light, e.g., ultraviolet rays through a mask.

In the as arrangement described above, the manufacturer injects gas to etch the dielectric layer. The etching may be conducted by injecting etching gas to the perpendicular grid pattern developed on the dielectric layer.

If the etching of the dielectric layer is completed, the dielectric layer is selectively removed to thereby form a perpendicular grid nano pattern on the substrate.

The perpendicular grid pattern that is formed through the exposure and etching processes projects in parallel with the moving direction of light, and as described above, may be formed corresponding to predetermined values of the first to five parameters falling under the first width Wx, second width Wy, first pitch Px, second pitch Py and height H to compensate for optical anisotropy, more particularly, to compensate for biaxial anisotropy of the liquid crystal layer 130.

The manufacturer may further perform a passivation with respect to the dielectric layer in which the grid pattern is formed, to deposit a passivation layer. Therefore, the dielectric layer in which a projection type perpendicular pattern is formed may be protected from a harmful environment as the passivation layer blocks absorption or movement of harmful ion.

To manufacture the perpendicular grid pattern as above, a process of manufacturing a master mold of a predetermined size that has a perpendicular grid pattern and a process of transferring the perpendicular grid pattern from the master mold to a substrate of the display panel 100 may be performed. The master mold may include crystal or silicon, and by the master mold, a perpendicular grid pattern is formed on an upper plate surface.

A method of transferring the pattern from the master mold to a substrate by a pattern template at a time may be used, and it may be more advantageous from the perspective of productivity to transfer the perpendicular grid pattern from the master mold corresponding to the entire area of the substrate than to divide the substrate into a plurality of area and to form the perpendicular grid pattern in each of the divided areas.

If a master mold is manufactured corresponding to the display panel 100 according to a certain specification, the manufacturer may apply the perpendicular grid pattern that is transferred from the master mold, to a plurality of display panels 100 of the same specification. This may be superior from the perspective of productivity since the perpendicular grid pattern is mass-produced through a single master mold.

The method of achieving the retardation compensation layer 160 as above is not limited to the example embodiment in FIG. 2 in which the pattern is formed on the lower surface of the upper substrate 110. For example, the process of forming the perpendicular grid pattern through the foregoing exposure, etching and accumulation may also apply to example embodiments in FIGS. 6 to 10 as will be described in greater detail below.

In the example embodiment in FIGS. 2 to 5, an example of the perpendicular grid nano pattern that projects in the direction opposite to the moving direction of light, i.e. in the −Z direction on the lower surface of the upper substrate 110 has been described, but the disclosure is not limited to the foregoing.

FIGS. 6 to 10 are cross-sectional views of an arrangement of elements of the display panel 100.

Figure 6:
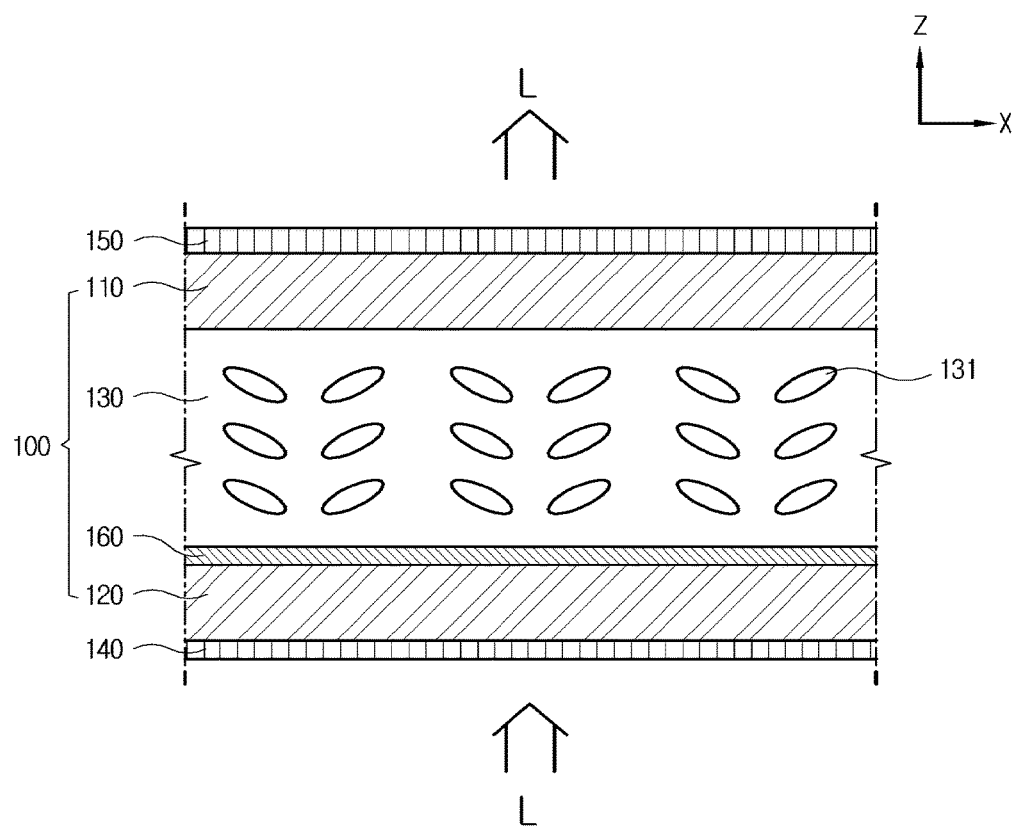
FIGS. 6 to 10 are cross-sectional views illustrating an example arrangement status of elements of a display panel.

The example embodiment illustrated in FIG. 6 has such characteristic that a perpendicular grid pattern is formed on an upper surface of the lower substrate 120 compared to the example embodiment in FIG. 2. For example, as illustrated in FIG. 6, the retardation compensation layer 160 is interposed between the liquid crystal layer 130 and the lower polarizing layer 140.

In the display panel 100 according to the example embodiment illustrated in FIG. 6, a nano pattern projecting in the same direction as the moving direction of light (in the +Z direction) is formed on an upper surface of the lower substrate 120 to realize the retardation compensation layer 160.

With the foregoing structure, light leakage phenomenon of the display panel 100 may be reduced and/or prevented and the viewing angle may be improved. For example, biaxial anisotropy of light may be compensated for by the single retardation compensation layer 160 that satisfies nx≠ny≠nz≠nx.

Figure 7:
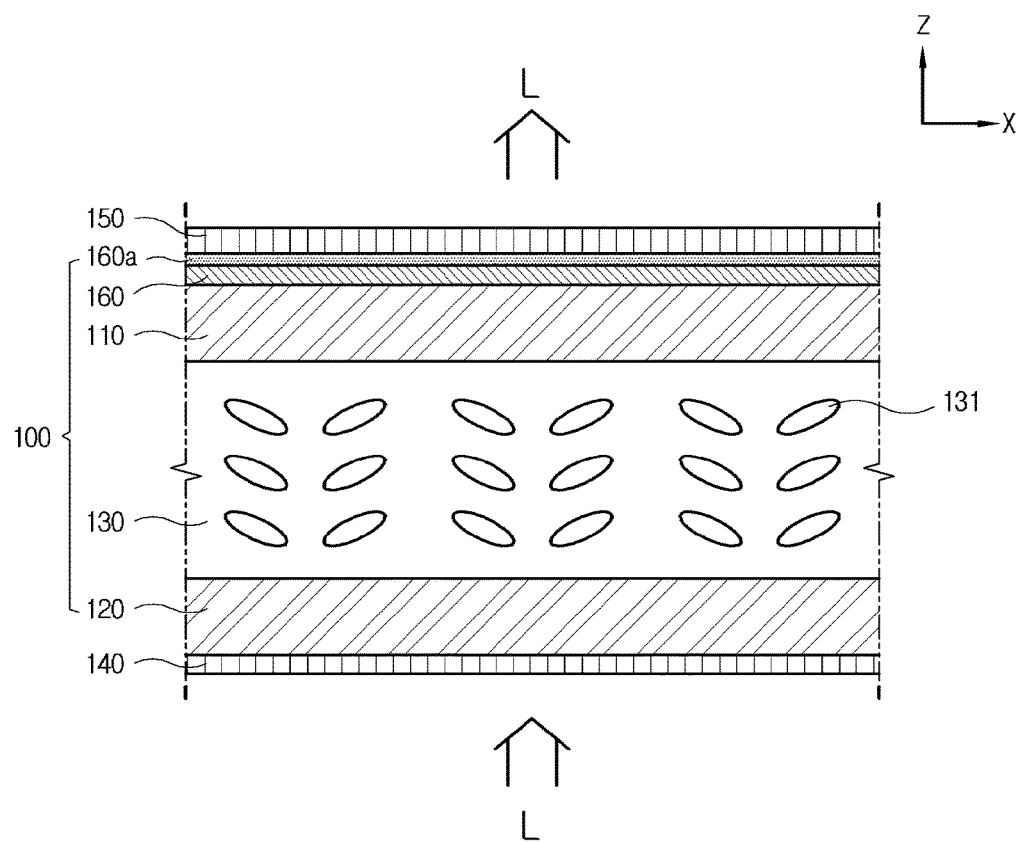

The example embodiment in FIG. 7 has such characteristic that a perpendicular grid pattern is formed on an upper surface of the upper substrate 110 compared to the example embodiment illustrated in FIG. 2. For example, as illustrated in FIG. 7, the retardation compensation layer 160 is interposed between the upper polarizing layer 150 and the liquid crystal layer 130.

In the display panel 100 according to the example embodiment in FIG. 7, a nano pattern projecting in the same direction as the moving direction of light (in the +Z direction) is formed on an upper surface of the upper substrate 110 to realize the retardation compensation layer 160.

In the display panel 100 in this example embodiment, a nano pattern as the retardation compensation layer 160 projects upwards on the upper surface of the upper substrate 100, a passivation layer 160a may be further interposed between the upper polarizing layer 150 and the retardation compensation layer 160 to protect the nano pattern.

Although it is not illustrated in drawings, the display panel 100 according to the disclosure may be achieved to form a perpendicular grid pattern as the retardation compensation layer 160 in a lower surface of the lower substrate 120. For example, a nano pattern projecting in a direction perpendicular to the moving direction of light (in the −Z direction) may be formed in a lower surface of the lower substrate 120, and like in the example embodiment illustrated in FIG. 7, a passivation layer 160a may be further interposed between the retardation compensation layer 160 and the lower polarizing layer 140 to protect the nano pattern.

With the foregoing structure, light leakage phenomenon of the display panel 100 may be reduced and/or prevented and the viewing angle may be improved. For example, biaxial anisotropy of light may be compensated for by the single retardation compensation layer 160 that satisfies nx≠ny≠nz≠nx. Further, the additional passivation layer may protect the nano pattern of the retardation compensation layer from the surrounding environment.

Figure 8:
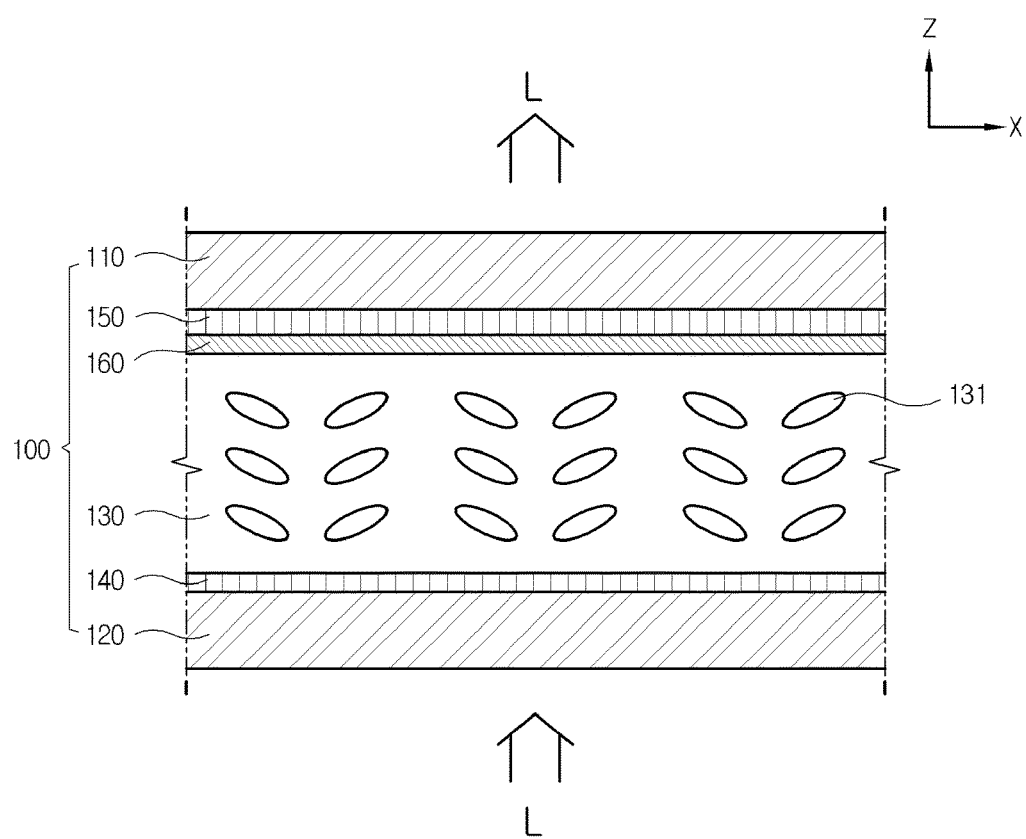

The example embodiment illustrated in FIG. 8 has such characteristic that the upper and lower polarizing layers 150 and 140 are provided as internal elements of the display panel 100 as compared to the example embodiments illustrated in FIGS. 2, 6 and 7.

For example, in the display panel 100 according to this example embodiment, the upper and lower polarizing layers 150 and 140 may include a linear grid (not shown) structure shaped like a plurality of bars (not shown) extending in a direction parallel to an X-Y plan on plate (i.e., inner) surfaces of the upper and lower substrates 110 and 120, respectively.

The single bar forming the linear grid (not shown) has a preset height and width, and each bar (not shown) is arranged at a preset pitch, and an extension direction thereof corresponds to each polarizing direction. The linear grid (not shown) of the upper polarizing layer 150 may project downwards from the upper substrate 110, and the linear grid (not shown) of the lower polarizing layer 140 may project upwards from the lower substrate 120.

As illustrated in FIG. 8, the lower and upper polarizing layers 140 and 150 may be arranged in an upper side of the lower substrate 120 and a lower side of the upper substrate 120, i.e., may be arranged in the interior of the display panel 100.

The lower polarizing layer 140 may be formed in a plate surface of the lower substrate 120 in the Z direction, i.e., in a plate surface of the lower substrate 120 in which the light is discharged. The lower polarizing layer 140 allows only a preset first polarizing direction component of the irradiation light L to pass through it, and reflects a non-first polarizing direction component.

The upper polarizing layer 150 is formed in a plate surface of the upper substrate 110 in the −Z direction, i.e., in a plate surface of the upper substrate 110 to which the irradiation light is incident. The upper polarizing layer 150 allows only a preset second polarizing direction component of the irradiation light L, which has passed through the lower substrate 120, the lower polarizing layer 140 and the liquid crystal layer 130, to pass through it, and reflects a non-second polarizing direction component.

The second polarizing direction is different from the first polarizing direction, and for example, is vertical to the first polarizing direction. Accordingly, the polarizing direction of light that passes through the upper polarizing layer 150 is vertical to the polarizing direction of light that passes through the lower polarizing direction 140. For example, as illustrated in FIG. 8, even if the upper and lower polarizing layers 150 and 140 are in a linear grid structure, they perform a role of polarizing and filtering the light as described in connection with FIG. 2.

The upper and lower polarizing layers 150 and 140 illustrated in FIG. 8 are illustrated as a single layer, but they are not limited to the foregoing. For example, the linear grid of the upper and lower polarizing layers 150 and 140 may have a structure of an arrangement of at least two of dielectric layer and metal layer in a predetermined order. From the perspective of the material, the dielectric layer may include silicon dioxide or silicon nitride, and the metal layer may include metal such as Au, Al, Cu and Ag that reflects light without difficulty or poly silicon.

In the display panel 100 according to an example embodiment illustrated in FIG. 8, the retardation compensation layer 160 is interposed between the upper polarizing layer 150 and the liquid crystal layer 130.

To do so, a manufacturer may, for example, form the upper polarizing layer 150 on a lower surface of the upper substrate 110 through exposure, etching and accumulation processes. Thereafter, the manufacturer performs the exposure, etching and accumulation processes, which have been described in connection with the example embodiment illustrated in FIG. 2, with respect to the lower surface of the upper substrate 110 in which the upper polarizing layer 150 has been formed, to further form a perpendicular grid pattern.

Then, in the display panel 100 according to the example embodiment illustrated in FIG. 8, a nano pattern that projects in a direction (−Z direction) opposite to the moving direction of light is formed in a lower side of the upper substrate 120 to provide the retardation compensation layer 160.

Although it is not illustrated in the drawings, the display panel 100 according to the disclosure may be achieved to form a perpendicular grid pattern as the retardation compensation layer 160 in an upper side of the lower substrate 120. For example, the lower polarizing layer 140 may be formed in a linear grid pattern on an upper surface of the lower substrate 120, and on the upper side thereof, a perpendicular grid nano pattern projecting in the same direction as the moving direction of light (in the +Z direction), i.e., projecting upwards may be formed.

With the foregoing structure, light leakage phenomenon of the display panel 100 may be reduced and/or prevented and the viewing angle may be improved. For example, biaxial anisotropy of light may be compensated for by the single retardation compensation layer 160 that satisfies nx≠ny≠nz≠nx.

Figure 9:
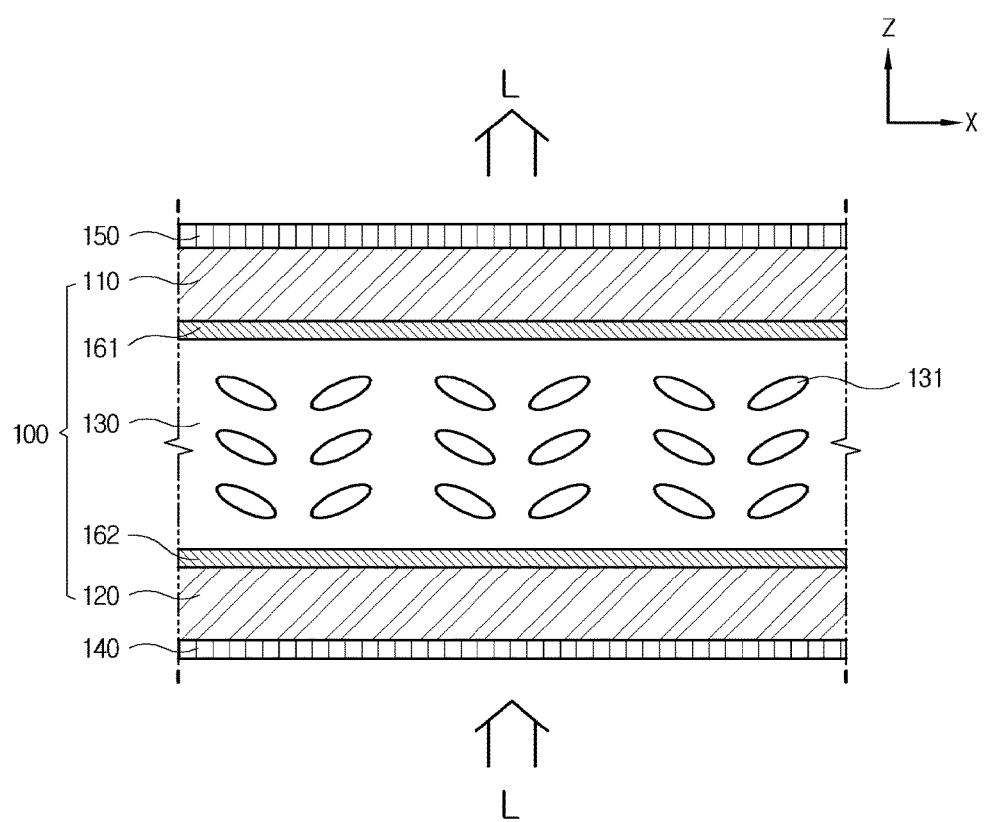

The example embodiment illustrated in FIG. 9 has such characteristic that a perpendicular grid pattern is formed on both a lower surface of the upper substrate 110 and an upper surface of the lower substrate 120 compared to the example embodiments illustrated in FIGS. 2 and 6. For example, as illustrated in FIG. 9, the retardation compensation layer includes a first retardation compensation layer 161 and a second retardation compensation layer 162. The first retardation compensation layer 161 is interposed between the upper substrate 110 and the liquid crystal layer 130, and the second retardation compensation layer 162 is interposed between the liquid crystal layer 130 and the lower substrate 120.

In the display panel 100 according to the example embodiment illustrated in FIG. 9, optical anisotropy of the liquid crystal layer 130 may be compensated for by a combination of a plurality of retardation compensation layers.

For example, the first retardation compensation layer 161 may have a characteristic of one of a C-plate that satisfies nx=ny≠nz, and an A-plate that satisfies nx≠ny=nz. The second retardation compensation layer 162 may be provided to compensate for biaxial anisotropy of light that passes through the liquid crystal layer 130, by being combined with the first retardation compensation layer 161.

For example, the first retardation compensation layer 161 has a characteristic of nx>ny=nz, and the second retardation compensation layer 162 has a characteristic of nx=nz>ny, and as a result, an optical compensation that satisfies nx>nz>ny is performed.

Although it is not illustrated in drawings, the display panel 100 according to the disclosure may be achieved to form a perpendicular grid pattern as the first retardation compensation layer 161 in an upper surface of the upper substrate 120 or to form a perpendicular grid pattern as the second retardation compensation layer 162 in a lower surface of the lower substrate 110. In such an example, an additional passivation layer may be further interposed between the first retardation compensation layer 161 and the upper polarizing layer 150 or between the lower surface of the second retardation compensation layer 162 and the lower polarizing layer 140 to protect the perpendicular grid pattern.

The display panel 100 according to the disclosure may be achieved to consecutively form a plurality of retardation compensation layers on a surface of the upper substrate 110 and the lower substrate 120. For example, the first retardation compensation layer 161 and the second retardation compensation layer 162 may be arranged in a lower surface of the upper substrate 110. In such an example, a manufacturer may form a grid pattern as the first retardation compensation layer with respect to the lower surface of the upper substrate 110 through the exposure, etching and accumulation processes, which have been described in connection with the example embodiment illustrated in FIG. 2, and then may form a perpendicular grid pattern as the second retardation compensation layer 162 on the lower surface of the upper substrate 110, in which the upper polarizing layer 150 has been formed, through the exposure, etching and accumulation processes.

Likewise, a plurality of retardation compensation layers 161 and 162 may be sequentially accumulated and formed in an upper surface of the upper substrate 110 or in an upper surface or a lower surface of the lower substrate 120.

With the foregoing structure, light leakage phenomenon of the display panel 100 may be reduced and/or prevented and the viewing angle may be improved. For example, biaxial anisotropy of various characteristics may be efficiently compensated for by the plurality of retardation compensation layers 161 and 162. Further, an additional passivation layer may protect the nano pattern of the retardation compensation from the surrounding environment.

Figure 10:
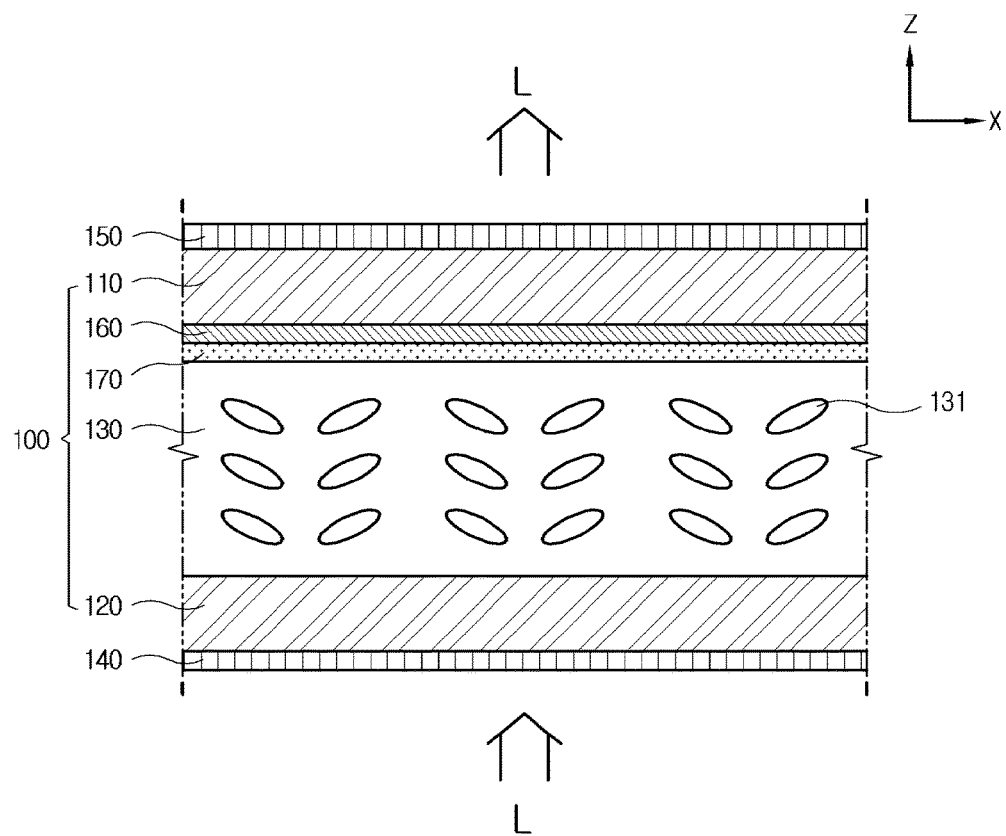

The example embodiment illustrated in FIG. 10 has such characteristic that the display panel 100 further includes a color filter layer 170 compared to the example embodiment illustrated in FIG. 2. For example, as illustrated in FIG. 6, the retardation compensation layer 160 may be interposed between the upper substrate 110 and the color filter layer 170.

The color filter layer 170 converts light that is incident to the display panel 100 into RGB colors. Pixels of the liquid crystal layer 130 include sub pixels corresponding to each of the RGB colors, and the color filter layer 170 filters sub pixels per color.

The color filter layer 170 may include a red color filer, a green color filter and a blue color filter. The color filter layer 170 changes a white color, which passes through the liquid crystal layer 130, into a colored light, e.g., into red light, green light and blue right. That is, each color filter allows only one of the red color, green color and blue color out of the white light consisting of red, green and blue lights, to pass through it.

In this example embodiment, the color filter layer 170 is arranged in the upper substrate 110, but the location of the color filter layer 170 is not limited thereto. Alternatively, the color filter layer 180 may also be arranged in the lower substrate 120, and even the display panel 100 in FIGS. 6 to 9 may be achieved by further including the color filter layer 170 arranged in the upper or lower side of the liquid crystal layer 130.

In the display panel 100 according to the example embodiment illustrated in FIG. 10, a nano pattern, which projects in a direction (−Z direction) opposite to the moving direction of light, is formed as the retardation compensation layer 160 on a lower surface of the upper substrate 110, and a color filter layer 170 is formed therebelow.

With the foregoing structure, light leakage phenomenon of the display panel 100 may be reduced and/or prevented and the viewing angle may be improved. For example, biaxial anisotropy of light may be compensated for by the single retardation compensation layer that satisfies nx≠ny≠nz≠nx.

Hereinafter, an example configuration of a display apparatus 200 will be described with reference to FIG. 11.

Figure 11:
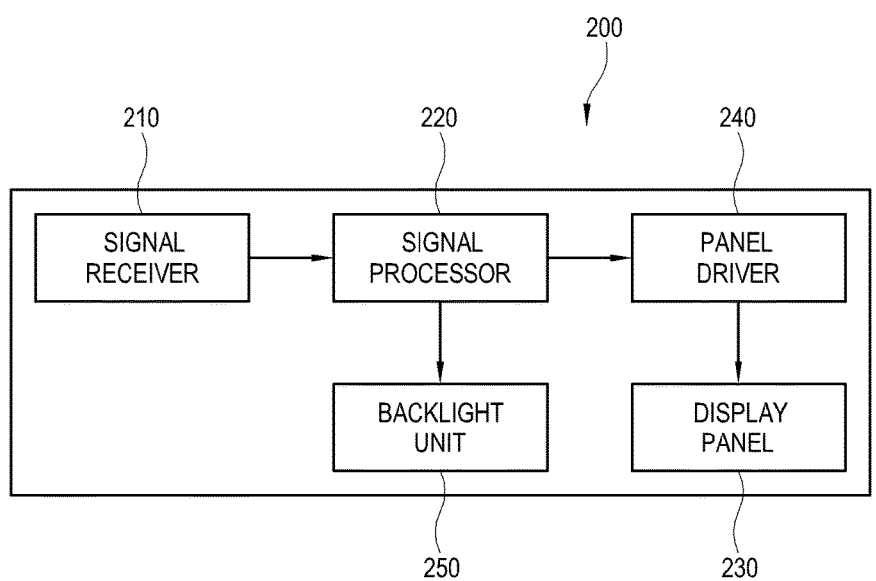
FIG. 11 is a block diagram illustrating an example display apparatus.

FIG. 11 is a block diagram illustrating an example of the display apparatus 200. The display apparatus 200 illustrated in FIG. 11 illustrates the display apparatus 1 in FIG. 1 from the perspective of image processing, and may be substantially the same as the display apparatus 1 in FIG. 1. For example, a display panel 230, a panel driver 240 and backlight unit 250 in FIG. 11 may include the elements of the display panel 30, panel driver 40 and backlight unit 50 in FIG. 1.

As illustrated in FIG. 11, the display apparatus 200 according to this example embodiment processes an image signal (input signal) supplied by an external image source (not shown) through a preset process and displays the processed image signal as an image in the display 130.

The display apparatus 200 in this example embodiment may be achieved by a television (TV) that displays a broadcast image based on a broadcast signal/broadcast signal/broadcast information/broadcast data received from a transmitter of a broadcasting station, or a monitor that receives an image signal from a main body of a personal computer (PC). However, the kind of images to be displayable on the display apparatus 200 is not limited to the broadcast image. For example, the display apparatus 200 may display a moving image, a still image, an application, an on-screen display (OSD), a user interface (UI or also referred to as a 'graphic user interface (GUI)') for controlling various operations, etc. based on a signal/data received from various types of image sources (not shown).

In an example embodiment, the display apparatus 200 may be achieved by a large display apparatus such as a digital signage or large format display (LFD), or the like. In addition, the display apparatus 200 may be achieved by a small-sized apparatus or a mobile device such as a smart phone, smart pad, e.g., tablet, car navigator, personal digital assistant (PDA), or portable media player (MP3 player), or the like.

According to an example embodiment, the display apparatus 200 may be achieved by a smart TV or internet protocol (IP) TV, or the like. The smart TV is capable of receiving and displaying a broadcast signal in real time, which has a web-browsing function to search and consume various contents through Internet while displaying the broadcast signal in real time and thus provides a convenient user environment. Further, the smart TV may have an open software platform to provide an interactive service to a user. Therefore, the smart TV can provide a user with various contents, for instance, applications corresponding to predetermined services, through the open software platform. Such an application refers to an application program for providing various services, for example, social network service (SNS), finance, news, weather, maps, music, movie, game, electronic book, etc.

For example, the following example embodiments to be described below are merely examples variously applicable in accordance with the types of apparatuses/systems, and do not limit the present inventive concept.

As illustrated in FIG. 11, the display apparatus 200 includes a signal receiver 210 for receiving an image signal, a signal processor 220 for processing an image signal received by the signal receiver 210 according, for example, to a preset image processing process, a display panel 230 for displaying an image therein based on an image signal, a panel driver 240 for outputting a driving signal to display an image in the display panel 230 corresponding to an image signal processed by the signal processor 220, and a backlight unit 250 for supplying light to the display panel 230 corresponding to an image signal processed by the signal processor 220.

The signal receiver 210 receives an image signal and transmits it to the signal processor 220. The signal receiver 210 may be variously achieved in accordance with formats of the received image signal and the types of the display apparatus 200. For example, the signal receiver 210 may receive a radio frequency (RF) signal from a broadcasting station (not shown) wirelessly, or may receive an image signal of composite video, component video, super video, SCART, high definition multimedia interface (HDMI) standards by a wire. The signal receiver 210 may include a tuner to be tuned to a channel corresponding to a broadcast signal if the image signal is the broadcast signal.

Further, the image signal may be received from an external apparatus. For example, the image signal may be output from a personal computer (PC), an audio/video (AV) system, a smart phone, a smart pad, or the like external apparatus. In addition, the image signal may be based on data received through Internet or the like network. In this case, the display apparatus 200 may perform network communication through the signal receiver 210, or may further include a separate network communicator. Besides, the image signal may be based on data stored in a storage that is nonvolatile like a flash memory, a hard disk drive, etc. The storage may be provided inside or outside the display apparatus 200. If the storage is placed outside the display apparatus 200, a connector (not shown) may be additionally provided to connect with the storage.

The signal processor 220 may be configured to perform various image processing processes previously set with respect to an image signal. The signal processor 220 outputs the processed image signal to the panel driver 240, thereby displaying an image on the display panel 230 based on the image signal.

There is no limit to the kind of image processing processes performed by the signal processor 220. For example, the image processing processes may include decoding corresponding to various image formats, de-interlacing, frame refresh rate conversion, scaling, noise reduction for improving image quality, detail enhancement, line scanning, etc. The signal processor 220 may be achieved by an individual group for independently performing each of the processes, or may be achieved by a system-on-chip (SoC) where various functions corresponding to such processes are integrated. For example, the display apparatus 200 may have the signal processor 220 therein that is achieved by an image processing board including various chipsets and memories to perform the foregoing image processing processes.

In this description, the image processing may refer to processing an input image signal through at least one processor (not shown) such as the signal processor 220 or a CPU for its intended purpose, and includes both analog signal processing and digital signal processing. In this specification, the image processing may include at least one of point processing, area processing, geometric processing and frame processing. The point processing processes each pixel based on a location of the pixel. The area processing may change a pixel value based on an original value of a pixel and a value of a neighboring pixel. The geometric processing may change a location or arrangement of pixels. The frame processing may change pixel values based on calculation of two or more images. Unless otherwise specifically mentioned herein, the image processing means the point processing.

The configurations of the display panel 230, panel driver 240 and backlight unit 250 are substantially the same as those in the foregoing example embodiments, and thus will not be described in detail.

FIG. 11 schematically illustrates only representative elements of the display apparatus 200, and the actual structure of the display apparatus 200 is more complicated and includes other additional elements that are described in this example embodiment.

For example, the display apparatus 200 may further include a user input interface (e.g., user input device) for receiving a user command, a storage for storing various data therein, a communicator (e.g., including communication circuitry) for performing wired/wireless communication with at least one external device, a controller for performing control operations with respect to various configurations of the display apparatus 200, and a power supply for supplying power to each element of the display apparatus 200. The controller may include at least one processor, a read only memory (ROM) as a non-volatile memory for storing a control program therein for controlling the display apparatus 200, and a random access memory (RAM) as a volatile memory for storing therein a signal or data input form the exterior of the display apparatus or for storing various operations performed by the display apparatus 200. The processor loads a program from the ROM storing such program therein onto the RAM and executes the loaded program, and may include at least one universal processor such as a central processing unit (CPU), an application processor (AP), or a microcomputer (MICOM), or a chip, e.g. integrated circuit (IC) chip provided as a program for performing a certain function and an exclusive processor for executing the program.

In this example embodiment, only a basic structure of the display apparatus 200 that directly relates to the spirit of the disclosure will be described, and a detailed structure that does not directly relate thereto will not be described.

Each of characteristics of the example embodiments may be coupled or combined to one another in part or in whole, and as can be fully understood by the person of ordinary skill in the art, technically various linkages and drivings are available, and the example embodiments can be independently or collectively performed.

According to the example embodiments, the perpendicular grid nano pattern is formed in a surface of at least one of the upper and lower substrates of the display panel to compensate for optical anisotropy of the liquid crystal layer, thereby replacing the existing viewing angle compensation film.

For example, the nano pattern is formed as a single layer on a surface of one of the upper and lower substrates, and even biaxial anisotropy of the liquid crystal layer having the refractive index of $nx \neq ny \neq nz \neq nx$ can be compensated for.

In the display panel according to the example embodiment, a design for compensating for optical anisotropy of various characteristics can be made by a simple method of setting a plurality of parameter values forming the perpendicular grid pattern using the dielectric, and great flexibility is provided in a panel manufacturing process.

As the structure for compensating for the optical retardation is provided within the cell, no additional retardation compensation film is needed, and thus the panel manufacturing process is shortened and a cost reduction is achieved.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display panel comprising:
    a first substrate;
    a second substrate arranged to face the first substrate;
    a liquid crystal layer interposed between the first and second substrates; and
    a retardation compensation layer comprising a perpendicular grid pattern arranged on an inner surface of one of the first and second substrates, said perpendicular grid pattern of said retardation compensation layer being configured to compensate for optical anisotropy of the liquid crystal layer, said perpendicular grid pattern having a first width corresponding to a first parameter in a first direction and a second width corresponding to a second parameter in a second direction perpendicular to the first direction.

2. The display panel according to claim 1, wherein the retardation compensation layer is interposed between one of the first substrate and the liquid crystal layer, and the second substrate and the liquid crystal layer.

3. The display panel according to claim 1, wherein the retardation compensation layer is configured to compensate for biaxial anisotropy of the liquid crystal layer having a refractive index of $nx \neq ny \neq nz \neq nx$, through the perpendicular grid pattern formed on the inner surface of one of the first and second substrates, wherein nx is a refractive index of light with respect to an X-axis direction component, ny is a refractive index of light with respect to an Y-axis direction component and nz is a refractive index of light with respect to a Z-axis direction component, wherein the Z-axis direction is parallel to a moving direction of light and directions of X-axis, Y-axis and Z-axis are all orthogonal to each other.

4. The display panel according to claim 1, wherein the retardation compensation layer comprises a perpendicular grid pattern projecting in parallel with a moving direction of light passing through the liquid crystal layer and extending along the first and second directions on a predetermined plane perpendicular to the moving direction of the light, and is arranged on the inner surface of one of the first and second substrates.

5. The display panel according to claim 4, wherein the perpendicular grid pattern is arranged with a preset height in the projecting direction, and a first width of portions of the perpendicular grid pattern extending in a first direction and a second width of portions of the perpendicular grid pattern extending in a second direction, and a first pitch and a second pitch with respect to the first and second directions, respectively.

6. The display panel according to claim 5, wherein the perpendicular grid pattern includes values of a first parameter corresponding to the first width, a second parameter corresponding to the second width, a third parameter corresponding to the first pitch, a fourth parameter corresponding to the second pitch and a fifth parameter corresponding to the height.

7. The display panel according to claim 1, further comprising:
    a first polarizing layer and a second polarizing layer for polarizing and filtering an irradiation light that passes through the liquid crystal layer, wherein
    the retardation compensation layer is interposed between the first polarizing layer and the second polarizing layer.

8. The display panel according to claim 7, wherein the first polarizing layer comprises a linear grid structure formed on a plate surface of the first substrate,
    the second polarizing substrate comprises a linear grid structure formed on a plate surface of the second substrate, and
    the retardation compensation layer is interposed between one of the first polarizing layer and the liquid crystal layer, and the second polarizing layer and the liquid crystal layer.

9. A display apparatus comprising:
    a display panel;
    a backlight configured to supply light to display an image in the display panel, wherein the display panel comprises:
    a first substrate;
    a second substrate arranged to face the first substrate;
    a liquid crystal layer interposed between the first and second substrates; and
    a retardation compensation layer comprising a perpendicular grid pattern which is arranged on an inner surface of one of the first and second substrates, and is configured to compensate for optical anisotropy of the liquid crystal layer, said perpendicular grid pattern having a first width corresponding to a first parameter in a first direction and a second width corresponding to a second parameter in a second direction perpendicular to the first direction.

10. The display apparatus according to claim 9, wherein the retardation compensation layer is interposed between one of the first substrate and the liquid crystal layer, and the second substrate and the liquid crystal layer.

11. The display apparatus according to claim 9, wherein the retardation compensation layer is configured to compensate for biaxial anisotropy of the liquid crystal layer having a refractive index of nx≠ny≠nz≠nx, through the perpendicular grid pattern formed on the inner surface of one of the first and second substrates, wherein nx is a refractive index of light with respect to an X-axis direction component, ny is a refractive index of light with respect to an Y-axis direction component and nz is a refractive index of light with respect to a Z-axis direction component, wherein the Z-axis direction is parallel to a moving direction of light and directions of X-axis, Y-axis and Z-axis are all orthogonal to each other.

12. The display apparatus according to claim 9, wherein the retardation compensation layer comprises a structure in which the perpendicular grid pattern projects in parallel with a moving direction of light passing through the liquid crystal layer and extends along the first and second directions on a predetermined plane perpendicular to the moving direction of the light, wherein the grid pattern is arranged on a surface of one or more of the first and second substrates.

13. The display apparatus according to claim 12, wherein the perpendicular grid pattern is arranged with a preset height in the projecting direction, and a first width and a second width with respect to the first and second directions, respectively, and a first pitch and a second pitch with respect to the first and second directions, respectively.

14. The display apparatus according to claim 13, wherein the perpendicular grid pattern includes values corresponding to a first parameter corresponding to the first width, a second parameter corresponding to the second width, a third parameter corresponding to the first pitch, a fourth parameter corresponding to the second pitch and a fifth parameter corresponding to the height.

15. The display apparatus according to claim 9, further comprising:
a first polarizing layer and a second polarizing layer for filtering an irradiation light that passes through the liquid crystal layer, wherein
the retardation compensation layer is interposed between the first polarizing layer and the second polarizing layer.

16. The display apparatus according to claim 15, wherein the first polarizing layer comprises a linear grid structure formed on a surface of the first substrate,
the second polarizing substrate comprises a linear grid structure formed on a surface of the second substrate, and
the retardation compensation layer is interposed between one of the first polarizing layer and the liquid crystal layer, and the second polarizing layer and the liquid crystal layer.

* * * * *